(12) United States Patent
McMaster et al.

(10) Patent No.: US 10,895,711 B2
(45) Date of Patent: Jan. 19, 2021

(54) POLYMER-FREE COMPLIANT OPTICAL MEMBER SUPPORT

(71) Applicant: Corning Incorporated, Corning, NY (US)

(72) Inventors: Brian Monroe McMaster, Pittsford, NY (US); Todd Robert McMichael, Rochester, NY (US); Glenn A Parker, Lima, NY (US)

(73) Assignee: Corning Incorporated, Corning, NY (US)

( * ) Notice: Subject to any disclaimer, the term of this patent is extended or adjusted under 35 U.S.C. 154(b) by 118 days.

(21) Appl. No.: 16/007,229

(22) Filed: Jun. 13, 2018

(65) Prior Publication Data

US 2019/0004275 A1    Jan. 3, 2019

Related U.S. Application Data

(60) Provisional application No. 62/525,882, filed on Jun. 28, 2017.

(51) Int. Cl.
G02B 7/02        (2006.01)

(52) U.S. Cl.
CPC ............. *G02B 7/025* (2013.01); *G02B 7/026* (2013.01)

(58) Field of Classification Search
CPC ................................ G02B 7/025; G02B 7/026
USPC .................................................. 359/811–830
See application file for complete search history.

(56) References Cited

U.S. PATENT DOCUMENTS

| 2,394,894 A | * | 2/1946 | Burgert | G02B 7/026 |
| | | | | 29/458 |
| 4,929,054 A | * | 5/1990 | Ahmad | G02B 7/026 |
| | | | | 359/820 |
| 5,428,482 A | * | 6/1995 | Bruning | G02B 7/021 |
| | | | | 359/811 |
| 6,284,085 B1 | | 9/2001 | Gwo | |

(Continued)

FOREIGN PATENT DOCUMENTS

| EP | 0230277 A2 | 7/1987 |
| WO | 2017218728 A1 | 12/2017 |

OTHER PUBLICATIONS

Kim, Hyo Soo, and Tony L. Schmitz. "Shear Strength Evaluation of Hydroxide Catalysis Bonds for Glass-Glass and Glass-Aluminum Assemblies." Precision Engineering, vol. 37, No. 1, Jul. 7, 2012, pp. 23-32., doi:10.1016/j.precisioneng.2012.06.004.*

(Continued)

*Primary Examiner* — Zachary W Wilkes
(74) *Attorney, Agent, or Firm* — Robert L. Carlson

(57) ABSTRACT

An assembly for fixing an optical element in a manner that decouples the optical element from mechanical stresses and thermal strains while providing freedom to facilitate alignment of the optical element, and while also eliminating polymers that can cause contamination problems including a mount configured for attachment to an optical system; a plurality of flexible members each having a first end affixed to or integrally extending from the mount, and a free end defining a bearing surface for supporting an optical element; and a polymer free bonding agent forming a hydroxide-catalyzed bond joining a surface of the optical member to the bearing surface. The optical element may be aligned with the flexible members without resting on the flexible members.

18 Claims, 6 Drawing Sheets

(56) References Cited

U.S. PATENT DOCUMENTS

| | | | |
|---|---|---|---|
| 6,392,825 B1 * | 5/2002 | Trunz | G02B 7/026 359/811 |
| 6,548,176 B1 | 4/2003 | Gwo | |
| 7,609,464 B2 | 10/2009 | Rief et al. | |
| 7,656,595 B2 | 2/2010 | Beck et al. | |
| 8,947,634 B2 | 2/2015 | Farnsworth et al. | |

OTHER PUBLICATIONS

International Search Report and Written Opinion PCT/US2018/040042 dated Oct. 1, 2018.

Kim et al; "Evaluation of Hydroxide Catalysis Bonding Strength"; Department of Mechanical and Aerospace Engineering; University of Florida; downloaded Apr. 10, 2017; 4 Pages.

* cited by examiner

POLYMER-FREE COMPLIANT OPTICAL MEMBER SUPPORT

This application claims the benefit of priority to U.S. Provisional Application Ser. No. 62/525,882 filed on Jun. 28, 2017, the content of which is relied upon and incorporated herein by reference in its entirety.

FIELD OF THE DISCLOSURE

This disclosure pertains to support structures for optical elements, and more particularly to a compliant support structure for optical elements that effectively decouples the optical member from stresses and thermal strain.

BACKGROUND OF THE DISCLOSURE

Industry practice for mounting optical elements, such as precision lenses for lithographic equipment, involves the use of compliant material to fixate a lens to a mount. The compliant material reduces induced deformations to the optical element when the mount is subjected to mechanical stresses or thermal strain.

Typically, the compliant material is a plastic comprised of an organic polymer that will bond to the optical element. Further, whether the compliant material comprises an organic polymer or an inorganic material, such as metal, the compliant material linking the optical member to the mount is typically secured to the optical member using an organic adhesive, such as an epoxy resin or a cyanoacrylate resin.

In certain optical systems, organic polymers can create contamination problems that degrade performance of the optical elements.

SUMMARY OF THE DISCLOSURE

Disclosed is a support structure to fixate an optical element in a manner that decouples the optical element from mechanical stresses and thermal strain while providing a desirable degree of freedom to facilitate alignment of the optical element in order to allow proper functioning of the optical element, while also eliminating polymers from the compliant material and adhesive.

The optical element assembly includes an optical element mount that can be configured for rigid attachment to an optical system, such as the lens housing of an optical system of a lithographic machine; a plurality of flexible metal members, each flexible metal member having a first end affixed to or integrally extending from the mount, and a free end defining a bearing surface for supporting an optical element; and an optical element joined to each of the bearing surfaces of the flexible members with an inorganic adhesive.

According to one embodiment of the disclosure, a compliant optical element mount assembly is provided. The assembly includes an optical element, a mount, one or more flexible members connected to the mount, and a polymer free bonding agent forming a hydroxide-catalyzed bond for binding the optical element to the one or more flexible members.

According to another embodiment, a compliant optical element mount assembly is provided. The assembly includes an optical element, a mount, one or more flexible members connected to the mount, a gap between the one or more flexible members and one of the optical element and the mount, and a polymer free bonding agent provided in the gap for binding the optical element to the one or more flexible members.

According to yet a further embodiment, a method of connecting an optical element to a mount is provided. The method includes the steps of providing a mount, aligning an optical element with one or more flexible members such that a gap exists between the optical element and the one or more flexible members, bonding the one or more flexible members to the optical element with a polymer free bonding agent applied within the gap, and connecting the one or more flexible members to the mount.

DETAILED DESCRIPTION

The disclosed optical element assembly employs an inorganic adhesive to affix an optical element to flexible metal members that act like springs to decouple deformations between the lens and the lens mount, while also facilitating precise alignment and avoiding contamination problems that can occur when organic materials are employed.

Figure 1:
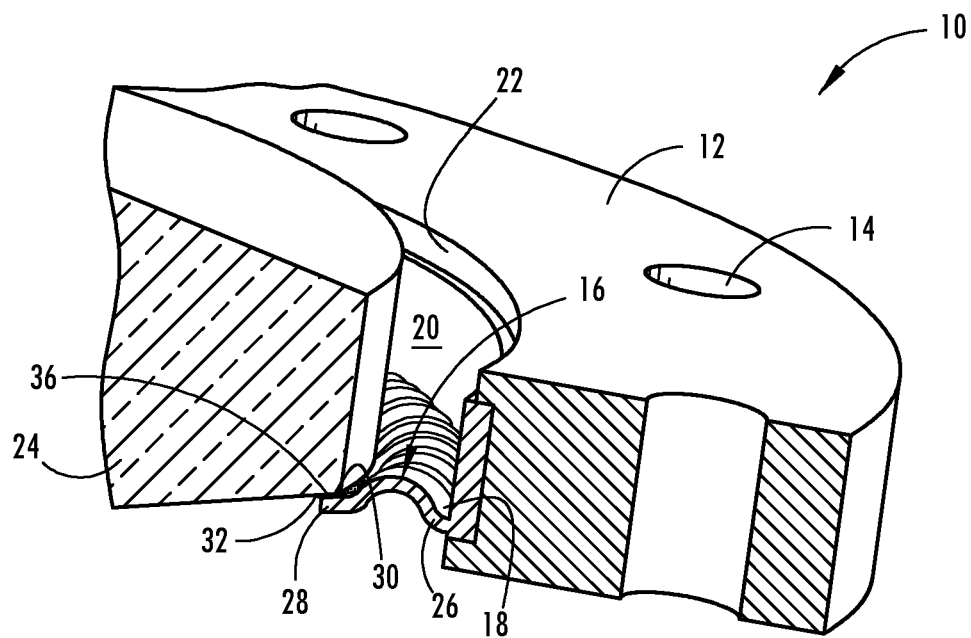
FIG. 1 is a sectioned perspective view of an assembly for mounting an optical element in accordance with this disclosure.

FIG. 1 shows one embodiment of an optical element assembly 10 in accordance with this disclosure. Assembly 10 includes a mount 12 having a ring-shape and defining attachment features or holes 14 for affixing the mount to an optical system, such as a housing for a combination of optical elements used in a lithography apparatus, using screws or other fasteners. Alternative attachment features may be used to facilitate a rigid attachment of the mount to an optical system using clamps or other securement devices. In the embodiment shown in FIG. 1, flexible metal members 16 are an integral portion of a retainer 18 having a ring-shaped wall portion 20 that abuts and is secured to an inner circumferential wall 22 of ring-shaped mount 12. Flexible members 16 extend radially inwardly and substantially perpendicularly from wall 20 toward an optical axis of an optical element 24. The "optical axis" refers to a line that extends perpendicularly through a center of a plane of main extension of the optical element. The flexible members 16 are spaced apart and have a thickness suitable to allow flexure of the flexible members to effectively isolate and decouple the optical element 24 from mechanical stresses and thermal strains. In this embodiment, the flexible members 16 have an inverted U-shape profile to impart resilience, springiness and/or rebound properties.

Integral wall 20 and flexible members 16 of retainer 18 are formed of a metal that can be secured to wall 22 of mount 12 with fasteners (e.g., screws), a frictional interference fit, and/or with an inorganic (or organic) adhesive. A first end 26 of each flexible member 16 extends integrally from wall 20, and an opposite free end 28 defines an upper bearing surface 30 for supporting optical element 24.

An inorganic adhesive 32 is disposed on the bearing surface 30 between flexible members 16 and corresponding surfaces of optical element 24 to secure optical element 24 on retainer 18, such that optical element 24 is held by mount 12, yet decoupled from mechanical stresses and thermal strains by the flexible members 16 of retainer 18.

As used herein, an "inorganic adhesive" is a substance capable of holding materials together by surface attachment. Additionally, as used herein, an "inorganic adhesive composition" or "inorganic adhesive composition precursor" is an adhesive or precursor to an adhesive, respectively, which contains inorganic materials, usually a majority by weight of inorganic materials, such as metal oxides, other inorganic additives, or both. Inorganic adhesive compositions, as described herein, may contain some amount of organic material, such as organic adhesion promoters. However, in one embodiment, the inorganic adhesive composition may generally comprise a ceramic material. In some embodiments, the inorganic adhesive composition may comprise one or more metal oxides such as, but not limited to, oxides of zinc, tin, aluminum, indium, iron, tungsten, titanium, zirconium, silicon, silicon nitride, boron, boron nitride, copper, silver, yttrium, rare earth ions, or combinations thereof. The inorganic adhesive may comprise one or more metal oxides doped with one or more other metal oxides, such as yttria-stabilized zirconia, sometimes referred to herein as "YSZ."

The optical element may be secured to the flexible members 16 by a method generally comprising depositing an inorganic adhesive composition precursor onto the optical element 24 and/or onto the bearing surface 30 and then bringing the optical element 24 and bearing surface 30 into contact with each other and solidifying the inorganic adhesive composition precursor to form an inorganic adhesive composition.

The inorganic adhesive composition precursor may comprise a metallic salt or other metal ion containing compound in a solvent. The metallic salt and/or other metal ion containing compound may comprise ions of zinc, tin, aluminum, indium, iron, tungsten, titanium, zirconium, silicon, silicon nitride, boron, boron nitride, copper, silver, yttrium, rare earth ions, or combinations thereof. In one embodiment, the metallic salt and/or or other metal ion containing compound may comprise ions of zirconium, yttrium, or both.

In some embodiments, the solvent may be a polar aprotic solvent. The polar aprotic solvents described herein have ion solvating properties that facilitate the process of making a stable inorganic adhesive composition precursor. The inorganic adhesive composition precursor may be a sol-gel solution. The sol-gel described herein may be different from traditional sol-gel chemistry in several important ways. For example, the proposed material reaction to form the sol-gel solution may not use alcohol solvents or conventional water/acid catalysis. Instead, the reaction may utilize metal salt concentrations in polar aprotic solvents (e.g. DMF, NMP) at relatively high concentration (0.5-2.0 M).

Polar aprotic solvents such as, for example, dimethylformamide (DMF) and n-methyl pyrrolidone (NMP), can be used to produce stable precursor solutions with metal salts and/or other metal ion containing compounds. Polar aprotic solvents may be described as solvents that share ion dissolving power with protic solvents but lack an acidic hydrogen. These solvents generally have intermediate dielectric constants and polarity. Aprotic solvents do not commonly display hydrogen bonding or have an acidic hydrogen. They are commonly able to stabilize ions. Examples of suitable polar aprotic solvents include dichloromethane (DCM), tetrahydrofuran (THF), ethyl acetate, acetone, dimethylformamide (DMF), acetonitrile, and dimethylsulfozide (DMSO).

Various metal oxides can be included in the inorganic adhesive composition based on the components of the inorganic adhesive composition precursor. For example, an inorganic adhesive composition comprising YSZ can be prepared by utilizing an inorganic adhesive composition precursor. Such an inorganic adhesive composition precursor may be prepared by mixing a first zirconia containing metal salt solution and a second yttria containing salt solution. The first solution may include zirconium oxychloride octohydrate ($Zr(OCl_2).8H_2O$, >99% from Sigma-Aldrich) dissolved in N,N-dimethylformamide (DMF). The second solution may include Yttrium Chloride ($YCl_3$ from Sigma Aldrich) dissolved in N,N-dimethylformamide (DMF). The first and second solutions may be prepared with molar concentrations having stoichiometry to achieve a ratio between the atom % values of Zirconia and Yttrium. For example, samples may contain 1%, 2%, 4% and 8% atom content of Yttrium in Zirconia. An ultrasonic bath may be used to facilitate mixing. The inorganic adhesive composition precursor may be clear and of significant viscosity.

An advantage of the inorganic adhesive compositions disclosed herein is the stability of the inorganic adhesive composition precursor. The inorganic adhesive composition precursor can be stored in ambient conditions for at least a month without significant degradation of the sol-gel chemical structure of the metal ions or the solvent.

The inorganic adhesive composition precursor is converted into the inorganic adhesive composition through a solidification step. The solidification may comprise exposing the inorganic adhesive composition precursor to a temperature in a range of from about 200° C. to about 1200° C. In other embodiments, the solidification may comprise exposing the inorganic adhesive composition precursor to a temperature in a range of from about 250° C. to about 1100° C., from about 300° C. to about 800° C., or from about 300° C. to about 600° C. During the solidification, the solvent may be liberated from the inorganic adhesive composition precursor and at least some of the components of inorganic adhesive composition precursor may be sintered.

The heating may be by oven, hot plate, or any other suitable heating mechanism. In some embodiments, other heating mechanisms such as microwave and inductive heating may be used. Time and temperature of such heating processes may vary depending upon the heating mechanism utilized in the solidification step. In one embodiment, the inorganic adhesive composition precursor may be heated with a laser. For example, a laser having a 40 W power rating at 810 nm focused on a spot size of approximately 2 mm may be used. However, the use of various laser powers, wavelengths, and surface areas is contemplated herein. The heating step may take less than about 3 minutes, less than about 2 minutes, less than about 1 minute, less than about 45 seconds, less than about 30 seconds, less than about 20 seconds, less than about 15 seconds, less than about 10 seconds, or even less than about 5 seconds. However, the time may be dependent upon the power of the laser and the contacting surface of the laser. The adhesive composition may then be allowed to cool by any process, such as by accelerated cooling or through cooling in an ambient atmosphere at or near room temperature.

Figure 2:
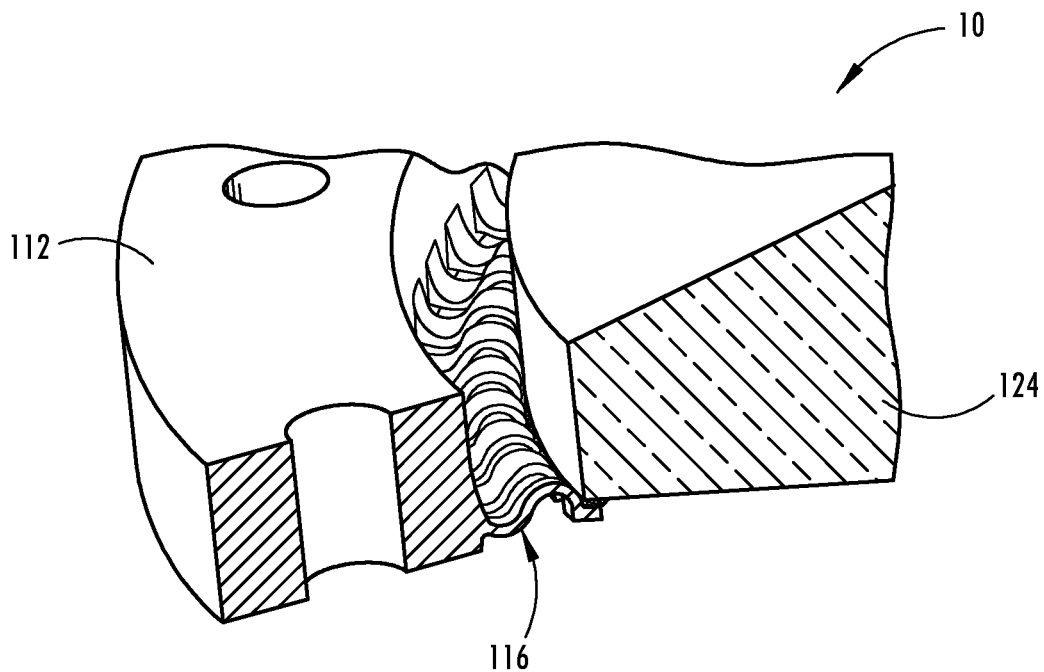
FIG. 2 is a sectioned perspective view of an alternative assembly for mounting an optical element in accordance with this disclosure.

Another embodiment 110 of the disclosed assembly for mounting an optical element is shown in FIG. 2. In this embodiment, flexible metal members 116 are integrally formed of the material forming mount 112. In other words, flexible metal members 116 and mount 112 are portions of a monolithic fixture. The structure of embodiment 110 is otherwise similar to, or substantially the same as embodiment 10. This embodiment 110 eliminates the task of affixing a retainer 18 to mount 12.

Figure 3:
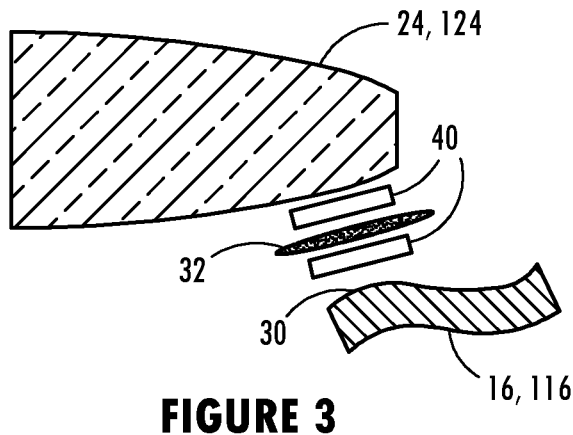
FIG. 3 is a schematic illustrating details of an adhesive attachment of a lens to a flexible metal member in accordance with this disclosure.

In any of the disclosed embodiments, adhesion between the optical element 24, 124 and the flexible metal members 16, 116 can optionally be enhanced by applying an adhesion promoting coating 40 to the binding surfaces of the optical element, the binding surface (bearing surface) of the flexible metal members, or both the binding surfaces of the optical element and the flexible metal members, as illustrated in FIG. 3. The adhesion promoting coating may include, without limitation, titanates (such as Tyzor 131 commercially available from DuPont), zirconates, (such as Tyzor 217 commercially available from DuPont), silanes (such as SIB 1824 and SIB 1821 commercially available from Gelest).

Figure 4:
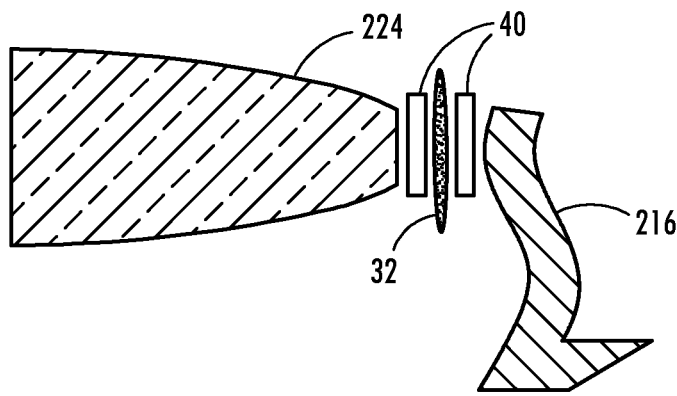
FIG. 4 is a schematic illustrating details of an alternative adhesive attachment of a lens to a flexible metal member in accordance with this disclosure.

FIG. 4 shows an alternative mounting of an optical element 224 to a flexible metal member 216 along edge surfaces of optical member 224. These geometries are illustrative, it being apparent that a plurality of alternative geometries may be employed.

Figure 5:
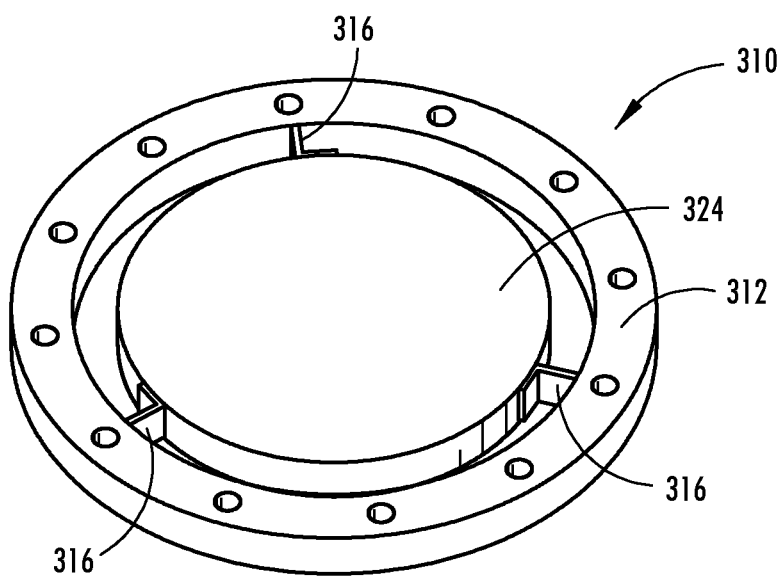
FIG. 5 is a perspective view of a further alternative assembly for mounting an optical element in accordance with this disclosure.

FIG. 5 shows another embodiment 310 in which flexible members 316 extend radially inwardly toward the optical axis of optical element 324 and include a lateral portion or free end that extends circumferentially and defines a bearing surface for adhesively joining the lens to the ring-shaped mount 312 while isolating the optical member from mechanical stresses and thermal strains. The flexures in FIG. 5 are articulated so that the optical element may be secured around the side perimeter of the optical element. Regardless of flexure geometry, the same optional coating(s) and binding agent can be used as previously described to secure and ensure that no gripping stress is transferred to the optical element.

Referring to FIGS. 6-10, an optical element assembly 410 is illustrated having a plurality of flexible members 416 connecting an optical element 424 to a mount 412, according to another embodiment. In this embodiment, the flexible members 416 are positioned between the optical element 424 and the mount 412 with a bond filled separation space or gap formed between the optical element 24 and one of the mount 412 and the one or more flexible members 416. In one embodiment, the gap is formed between each connecting end of the flexible members 416 and the contact surface of the optical element 424 such that the optical element 424 does not bear upon or rest on a portion of the flexible members 416 or the mount 412 during the alignment and assembly process. This allows the optical element 424 to be oriented in a plurality of directions including left, right, up, down and tilted positions, substantially free of a resting position on the flexible members 416 and mount 412 connected thereto. The optical element 424 is connected to each of the flexible members 416 with a polymer-free inorganic bonding agent forming a hydroxide-catalyzed bond, according to one embodiment. The bonding agent may include a filler material and spans the gap to connect the flexible members 416 with the optical element 424.

Figure 6:
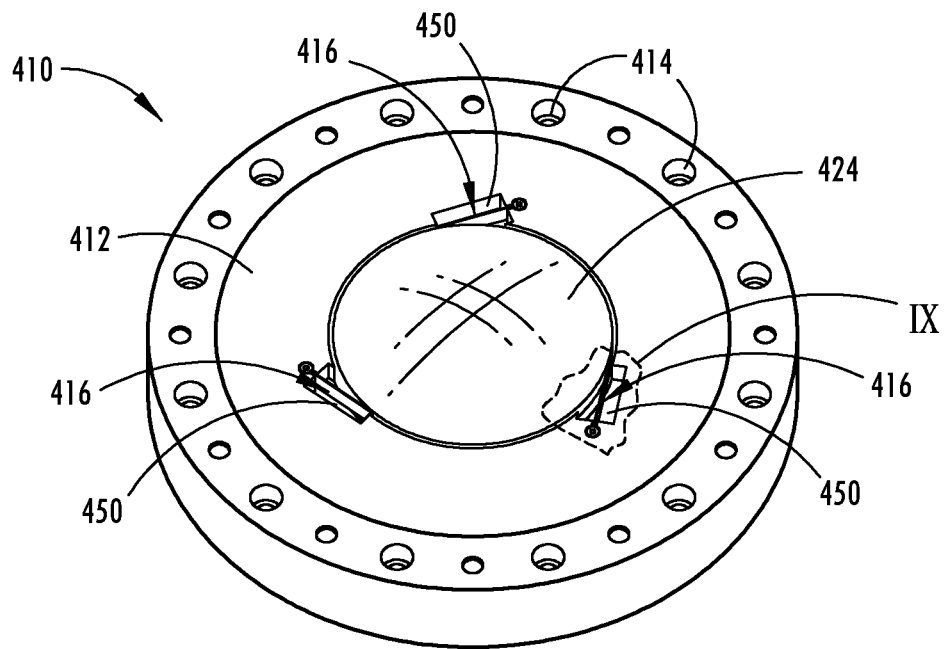
FIG. 6 is a front perspective view of an assembly for mounting an optical element, according to another embodiment.
Figure 7:
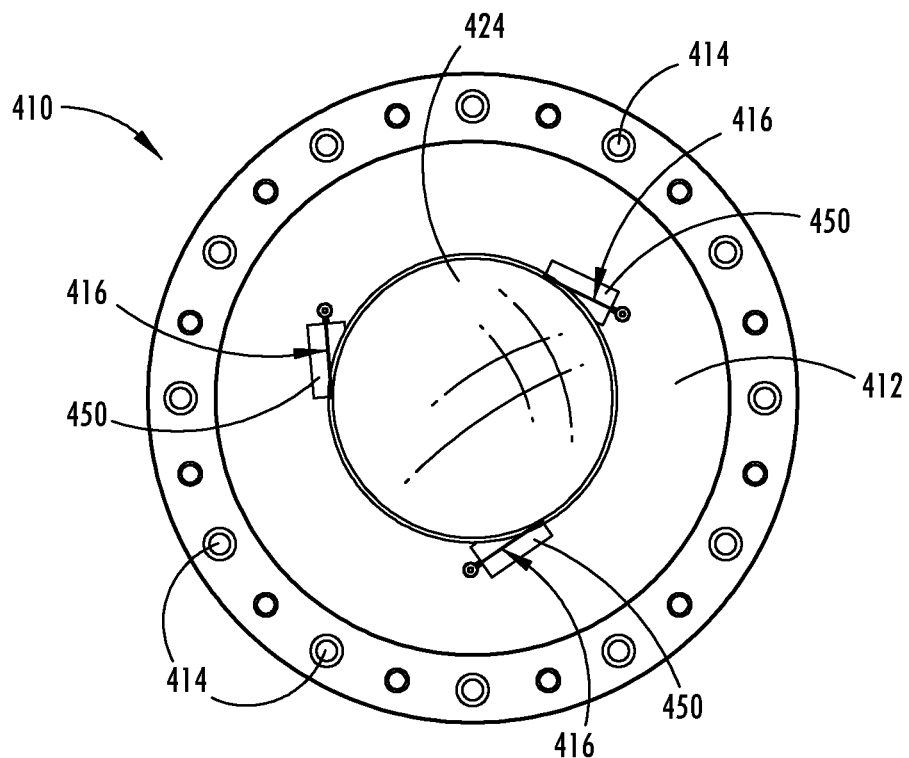
FIG. 7 is a front view of the assembly shown in FIG. 6.

As seen in FIGS. 6 and 7, the plurality of flexible members 416 are illustrated having three flexible members equiangularly spaced around the optical element 424 by separation angles of one hundred degrees (180°, according to one example. It should be appreciated that one or more flexible members 416 may be employed to support the position and aligned orientation of the optical element 424 relative to the mount 412. The mount 412 is shown as a ring-shaped mount which may be a metal cell formed of stainless steel alloy, nickel steel, titanium, aluminum, brass or other metals or glass and may have attachment features or holes 414, according to one embodiment. The optical element 424 which is shown in one embodiment as a glass lens has a circular outer circumference with an outer diameter that is less than the inner diameter of the ring-shaped mount 412 and has a shape that is conformal therewith. The optical element 424 may be a mirror or prism, according to other embodiments. It should be appreciated that other shapes and sizes of optical element 424 and mount 412 may be employed.

Figure 8:
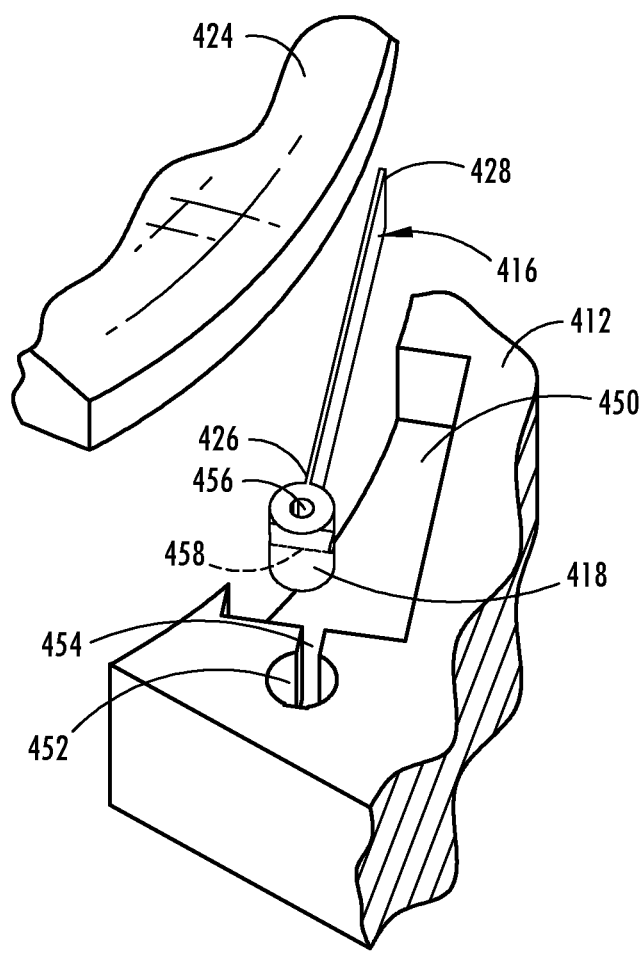
FIG. 8 is an enlarged exploded view of a portion of the assembly of FIG. 6 showing attachment of a flexible metal member, according to one embodiment.

One of the flexible members 416 is shown in FIG. 8 having a first end 426 and a retainer 418 provided at the first end 426 for connection with the mount 412. The flexible member 416 also has a second free end 428 opposite the first end 426. In the embodiment shown in FIG. 8, the flexible member 416 is a substantially linear or planar spring that may impart resilience, springiness and/or rebound properties when bent during flexure. The flexible member 416 may be made of metal with an oxide on the surface, according to one embodiment, or may be made of glass, according to another embodiment. The flexible members 416 are each placed within separate cutout portions 450 formed in the top surface of the mount 412. Also formed in the top surface of the mount 412 is a retaining opening 452 and a passage 454 connecting the retaining opening 452 to cutout portion 450. The cutout portion 450 and passage 454 allow the flexible member 416 to move during the alignment and assembly process and during flexure of the flexible member 416 due to stress and strain. The retaining opening 452 has a shape substantially similar to the outer shape of the retainer 418 and an opening slightly larger than the outer surface of the retainer such that the retainer 418 may be disposed within opening 452 with a space or gap provided therebetween and aligned during the assembly of the optical element 424 and flexible members 416. The retainer 418 is also shown having a vertical opening 456 and a crossing horizontal opening 458 formed therein. When the retainer 418 is disposed within opening 452 and the flexible member 416 is aligned in a desired orientation with the optical element 424, a polymer free bonding agent forming a hydroxide-catalyzed bond or a binder or an adhesive, such as a polymer-free inorganic adhesive or a potting compound which may include a polymer such as epoxy or an ultraviolet (UV) curable polymer is disposed within the gap in the opening 452 surrounding retainer 418 and within openings 456 and 458 so as to fixedly bond or adhere the retainer 418 to the mount 412. The gap in the space between opening 452 and retainer 418 allows the optical element 424 to move relative to mount 412 for alignment and assembly therewith.

The optical element 424 is arranged such that the outer ring-shaped surface is positioned freestanding with a gap 431 adjacent to a surface at or near the free end 428 of each of the flexible members 416 and aligned prior to being bonded to the flexible members 416. It should be appreciated that the optical element 424 may be oriented in various directions relative to the mount 412 during the alignment process. The optical element 424 may move horizontally, e.g., left and right, and vertically, e.g., up and down, and may be tilted at an angle to achieve the desired alignment with the mount 412 prior to being bonded to the flexible members 416 and/or prior to the flexible members 416 being bonded to the mount 412.

Figure 9:
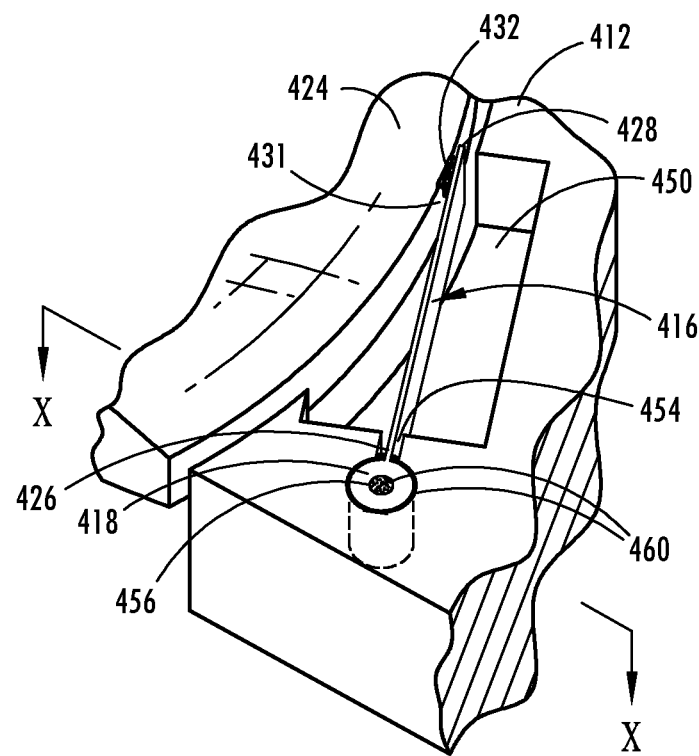
FIG. 9 is an enlarged perspective view of section IX of FIG. 6 showing the assembled flexible metal member and attachment to the optical element and the mount.
Figure 10:
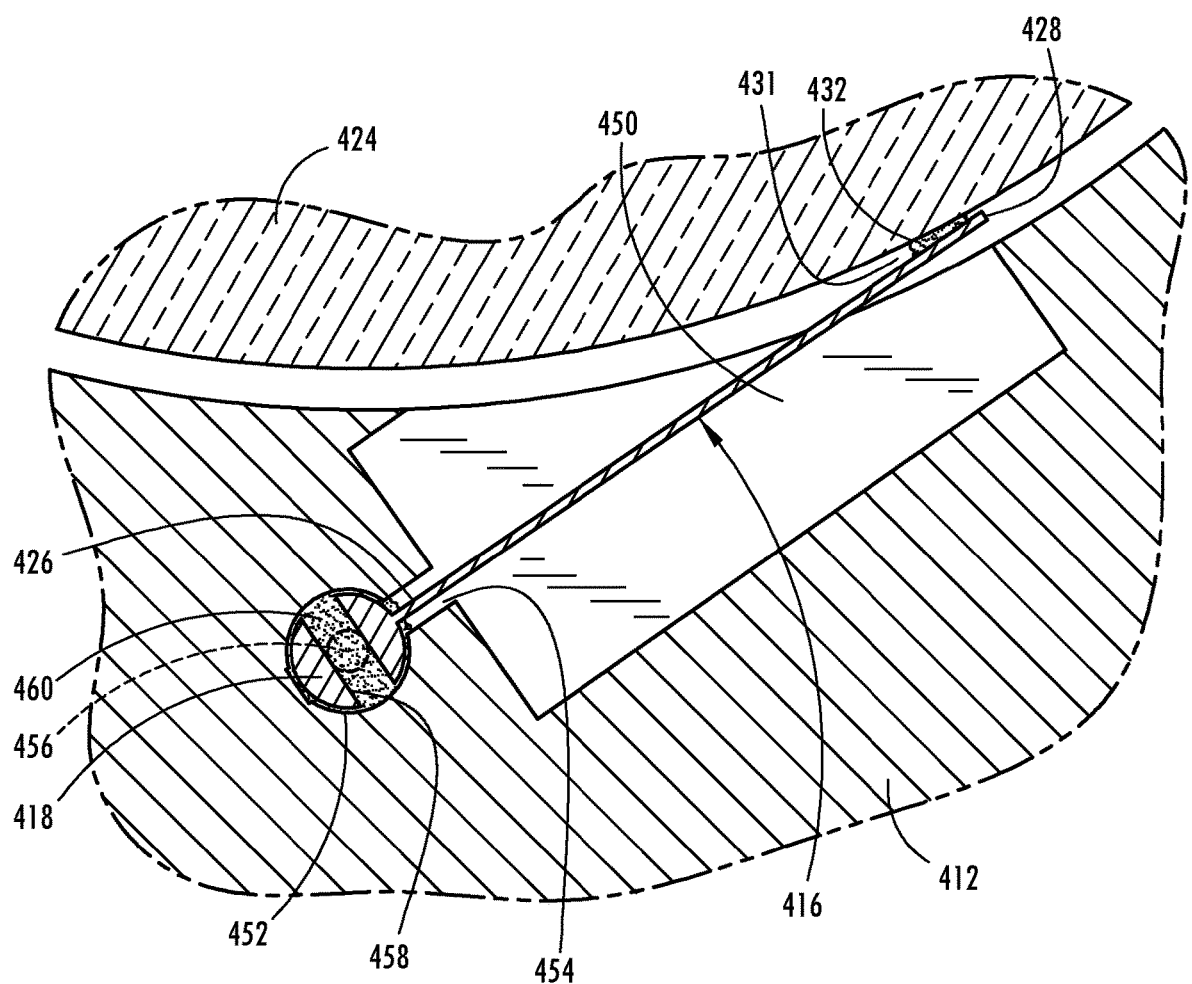
FIG. 10 is a top view of the portion of the assembly shown in FIG. 9.

Referring to FIGS. 9 and 10, the optical element 424 may be connected to each of the flexible members 416 with the use of a polymer-free inorganic bonding agent 432, such as a hydroxide ion bonding agent 432 that forms a hydroxide-catalyzed bond, according to one embodiment. The polymer-free inorganic bonding agent 432 in the form of hydroxide ions with a filler material may be applied within the gap 431 and in contact with both the connecting outer surface of the optical element 424 and the connecting free end 428 of each of the flexible members 416. Prior to applying the hydroxide bonding agent 432, both the connecting outer surface of the optical element 424 and the connecting free end 428 of each of the flexible members 416 may be prepared by stripping off organic material using an ultrasonic process with a detergent and cleaned of contaminants by applying a mild acid or using an ultraviolet (UV) ozone cleaning technique. The hydroxide bonding agent 432 with the hydroxide ions is a catalyst that forms a hydroxide-catalyzed bond between the glass optical element 424 which may be formed of SiO2 (silicon dioxide) and the flexible members 416 which may be formed of metal with an oxide on the connecting surface or alternatively may be formed of glass such as silica. The hydroxide bonding agent 432 may consume very little space, if any, within the gap 431. In order to fill the gap 431, a filler material may be employed with the hydroxide ions. Examples of filler material may include an inorganic material such as glass, sand or metal. The filler material will bond to itself and to the connecting surfaces with the hydroxide-catalyzed bond. Thus, the hydroxide bonding agent 432 may be used both with or without a filler material.

The hydroxide ions form a hydroxide-catalyzed bond to bond a surface of the optical element 424 formed of glass to the surface of each of the flexible member 416. The hydroxide-catalyzed bond is also referred to as hydroxide-catalyzed hydration/dehydration. This method may involve applying a bonding agent to at least one of the surfaces to be bonded and placing the surface sufficiently close to the other surface to be bonded such that a bonding interface is formed between the two surfaces. A bonding agent or material in the form of a source of hydroxide ions which may optionally include a filler material such as silicate (e.g., glass), may be used. The hydroxide ions may be contained in an alkaline aqueous solution which may be applied to at least one of the two surfaces. Materials that function as a source of the hydroxide ions when placed in an aqueous solution include potassium hydroxide, calcium hydroxide, strontium hydroxide, sodium hydroxide, ammonia water, and sodium ethoxide. Due to the hydration/dehydration, a silicate-like network can be formed by means of the hydroxide/catalyzed hydration and dehydration. The optical element 424 formed of glass or silica is capable of forming a silicate-like network by hydroxide-catalysis hydration and dehydration. The flexible members 416 made of metal with oxide or glass can be linked to a silicate-like network by the use of the hydroxide-catalysis hydration and dehydration. As a result, a strong bond is formed between the surface of the optical element 424 and each surface of the flexible members 416 and also any filler material therebetween and is not susceptible to contamination of the optical element 424 or damage caused by UV radiation.

In addition to or in lieu of providing the gap 431 between the free end 428 and the contact surface of the optical element 424, the gap formed between the opening 452 and retainer 418 may be filled with the hydroxide bonding agent with a filler material to form a hydroxide-catalyzed bond or with another adhesive or bonding agent. As such, a gap may be formed at either or both ends of the flexible members 416 to allow for easy alignment of the optical element 424 relative to the mount 412 and bonded with a bond and filler material to fixate the assembly.

During assembly, the optical element 424 may be positioned within the mount 412 in close proximity to each of the flexible members 416 such that a gap 431 exists between each of the flexible members 416 and the optical element 424. The optical element 424 may be oriented without restriction from contact with the flexible members 416 into a desired position and alignment, depending on the application. Once the alignment of the optical element 424 and flexible members 416 is achieved, the free ends 428 of the flexible members 416 are bonded to the outer surface of the optical element 424 using a polymer-free inorganic bonding agent 432 containing hydroxide ions to a hydroxide-catalyzed bond. The first end 426 of the flexible members 416 is positioned extending within opening 450 such that the retainer 418 extends within opening 452. A bonding agent or adhesive 460 is then applied between the retainer 418 and opening 450 and within openings 456, 458 to adhere and fix the first end 426 of each flexible member 416 to the mount 412 once the optical element 424 is positioned in the desired orientation. As such, the second free end 428 of the flexible members 416 may be first aligned with the optical element 424 and the final orientation of the assembly may be achieved by securing the first end 426 of the flexible members to the mount 412. According to another embodiment, the flexible members 416 may be monolithically formed as part of the mount 412.

Figure 11:
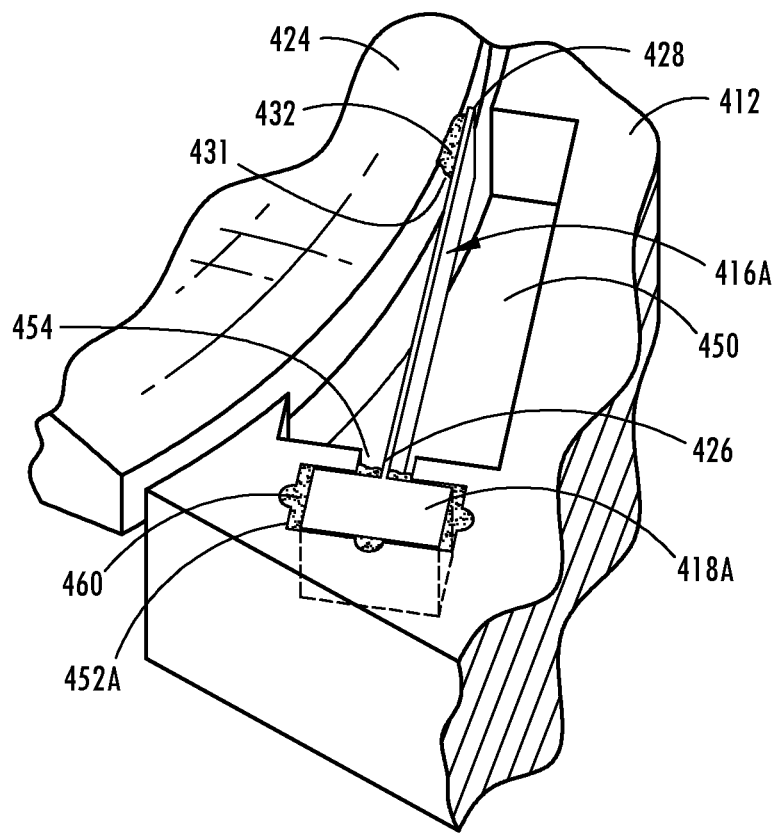
FIG. 11 is a perspective view of a portion of the assembly having a flexible member, according to another embodiment.

In the embodiment shown, the flexible members 416 have a cylindrical-shaped retainer 418 disposed within a cylindrical opening 452 which allows for easy rotation of the flexible member 416. It should be appreciated that the retainer 418 may have various other shapes and sizes. For example, as shown in FIG. 11, the flexible member 416A may have a retainer 418A with a rectangular shape disposed within a rectangular retainer opening 452A. The bond or adhesive 460 is applied between the retainer 418A and opening 452A to fixedly adhere the first end 426 to the mount 412.

Figure 12:
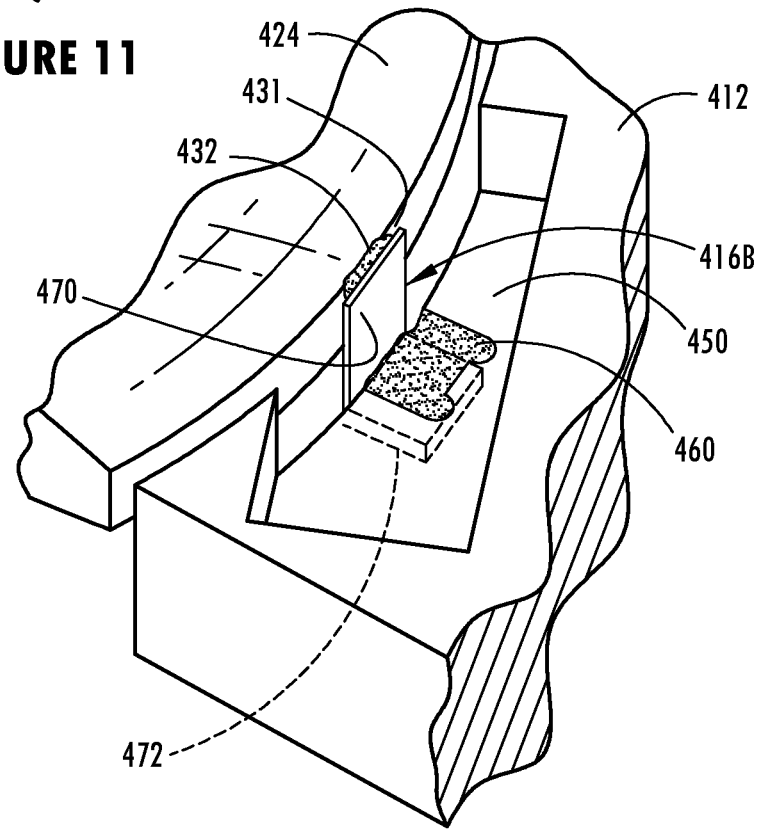
FIG. 12 is a perspective view of a portion of the assembly having a flexible member, according to a further embodiment.

Referring to FIG. 12, an optical element assembly 410 is illustrated having a flexible member 416B formed in a generally L-shaped configuration, according to another embodiment. In this embodiment, the flexible member 416B has a vertical extending portion 470 connected to a horizontal extending portion 472. The vertical portion 470 may be bonded onto the outer surface of the optical element 424 via a polymer-free inorganic bonding agent 432 containing hydroxide ions to form a hydroxide-catalyzed bond. The horizontal portion 472 is adhered onto the mount 412 within opening 450 via a second polymer-free inorganic bond or adhesive 460. As such, the L-shaped flexible member 416B enables the optical element 424 to be aligned with the mount 412 with a gap 431 therebetween which is filled with a polymer-free inorganic bond or adhesive 432. It should be appreciated that the flexible members 416, 416A and 416B may be configured in other shapes and sizes, according to other embodiments.

Unless otherwise indicated it is envisioned that any feature of any embodiment can, unless incompatible, be used in any other embodiment. Optical elements that may be employed include lens, mirrors and prisms.

The described embodiments are preferred and/or illustrated, but are not limiting. Various modifications are considered within the purview and scope of the appended claims.

What is claimed is:

1. A compliant optical element mount assembly comprising:
    an optical element;
    a mount;
    one or more flexible members each having a first end and a second end, wherein the first end is connected to the mount solely via a first bond;
    a gap between the optical element and the second end of each of the one or more flexible members; and
    a second bond comprising a polymer free bonding agent forming a hydroxide-catalyzed bond for binding the optical element to the second end of each of the one or more flexible members, wherein the bonding agent is applied in the gap.

2. The assembly of claim 1, wherein the optical element comprises glass and the one or more flexible members comprises metal.

3. The assembly of claim 1, wherein the optical element comprises a lens.

4. The assembly of claim 1, wherein the bonding agent further comprises a filler material to fill the gap.

5. The assembly of claim 1 further comprising a second gap between the first end of each of the one or more flexible members and the mount, and wherein the first bond comprises potting compound within the second gap to connect the first end of each of the one or more flexible members to the mount.

6. The assembly of claim 1, wherein the mount comprises a metal cell.

7. The assembly of claim 1, wherein the mount defines a retainer opening and the first end of the one or more flexible members comprises a retainer having an outer shape substantially similar to an inner shape of the retainer opening.

8. A compliant optical element mount assembly comprising:
    an optical element;
    a mount defining a retainer opening;
    one or more flexible members each having a first end and a second end, wherein the first end has a retainer disposed in the retainer opening and connected to the mount via a first bond;
    a first gap between the retainer and the retainer opening, wherein the retainer has an outer shape substantially similar to an inner shape of the retainer opening, and wherein the first bond is provided in the first gap;
    a second gap between the second end of each of the one or more flexible members and the optical element; and
    a second bond comprising a polymer free bonding agent provided in the second gap to form a hydroxide-catalyzed bond for binding the optical element to the second end of each of the one or more flexible members.

9. The assembly of claim 8, wherein the optical element comprises glass and the one or more flexible members comprises metal.

10. The assembly of claim 8, wherein the optical element comprises a lens.

11. The assembly of claim 8, wherein the first bond comprises a potting compound connecting the first end of each of the one or more flexible members to the mount.

12. The assembly of claim 8, wherein the first end of the one or more flexible members is connected to the mount solely via the first bond.

13. A method of connecting an optical element to a mount, comprising:
    providing a mount;
    aligning an optical element with one or more flexible members each having first and second ends such that a gap exists between the optical element and the second end of each of the one or more flexible members;
    bonding the second end of each of the one or more flexible members to the optical element with a polymer free bonding agent applied within the gap by applying the polymer free bonding agent to form a hydroxide-catalyzed bond in the gap to bond the optical element to the one or more flexible members; and
    connecting the one or more flexible members to the mount by binding the first end of each of the one or more flexible members to the mount with a potting compound, wherein the first end is connected to the mount solely by the potting compound.

14. The method claim 13, wherein the step of binding the first end of each of the one or more flexible members to the mount occurs after the step of bonding the second end of each of the one or more flexible members to the optical element.

15. The method of claim 13, wherein the optical element comprises glass and the one or more flexible members comprises metal.

16. The method of claim 13, wherein the polymer free bonding agent further comprises a filler material to fill the gap.

17. The method of claim 13, wherein the mount comprises a metal cell.

18. The method of claim 13, wherein the mount defines a retainer opening and the first end of the one or more flexible members has a retainer having an outer shape substantially similar to an inner shape of the retainer opening.

* * * * *

UNITED STATES PATENT AND TRADEMARK OFFICE
CERTIFICATE OF CORRECTION

PATENT NO. : 10,895,711 B2
APPLICATION NO. : 16/007229
DATED : January 19, 2021
INVENTOR(S) : Brian Monroe McMaster et al.

Page 1 of 1

It is certified that error appears in the above-identified patent and that said Letters Patent is hereby corrected as shown below:

In the Claims

In Column 10, Line 40, Claim 14, delete "The method claim" and insert -- The method of claim --, therefor.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*